(12) United States Patent
Kinnard et al.

(10) Patent No.: US 7,381,890 B1
(45) Date of Patent: Jun. 3, 2008

(54) RECESSED ELECTRICAL OUTLET COVER AND BOX

(75) Inventors: John Kinnard, Queen Creek, AZ (US); Richard L. Cleghorn, Tempe, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 11/619,295

(22) Filed: Jan. 3, 2007

Related U.S. Application Data

(60) Provisional application No. 60/756,023, filed on Jan. 3, 2006.

(51) Int. Cl.
*H01J 5/00* (2006.01)

(52) U.S. Cl. ............... 174/50; 174/48; 174/60; 220/4.02; 439/535; 248/906

(58) Field of Classification Search ........... 174/50, 174/58, 63, 17 R, 48, 57, 60; 220/3.6, 3.8, 220/3.92, 4.02, 3.3; 248/906; 439/535; 307/112
See application file for complete search history.

(56) References Cited

U.S. PATENT DOCUMENTS

| | | | |
|---|---|---|---|
| 872,694 A | 12/1907 | Thiem | |
| 946,646 A | 1/1910 | Pratt | |
| 1,228,731 A | 6/1917 | Abbott et al. | |
| 1,608,621 A | 11/1926 | Sachs | |
| 1,784,277 A | 12/1930 | Darlington | |
| 1,952,719 A | 3/1934 | Lewin | |
| 2,240,187 A | 4/1941 | Kingdon et al. | |
| 2,321,640 A | 6/1943 | Adkins | |
| 2,596,236 A | 5/1952 | Glosier | |
| 2,916,733 A | 12/1959 | Hirsch | |
| 3,104,774 A | 9/1963 | Hudson et al. | |
| 3,252,611 A | 5/1966 | Weitzman et al. | |
| 3,432,611 A | 3/1969 | Gaines et al. | |
| 3,437,738 A | 4/1969 | Wagner | |
| 3,438,534 A | 4/1969 | Zerwes | |
| 3,491,327 A | 1/1970 | Tait et al. | |
| 3,518,356 A | 6/1970 | Freidman | |
| 3,525,450 A | 8/1970 | Payson | |
| 3,530,230 A | 9/1970 | Cormier et al. | |
| 3,544,703 A | 12/1970 | Jones | |
| 3,564,112 A | 2/1971 | Algotsson | |
| 3,690,035 A | 9/1972 | Schindlauer | |
| RE28,489 E * | 7/1975 | Schindler et al. | ............. 174/58 |
| 3,895,179 A | 7/1975 | Wyatt | |
| 3,965,287 A | 6/1976 | Mueller | |
| 4,014,450 A * | 3/1977 | Girotti et al. | ............... 220/4.24 |
| 4,032,030 A | 6/1977 | Bass et al. | |
| 4,197,959 A | 4/1980 | Kramer | |

(Continued)

*Primary Examiner*—Dhiru R Patel
(74) *Attorney, Agent, or Firm*—Booth Udall, PLC

(57) ABSTRACT

An electrical box assembly that includes a box body having a screw mount aperture and a base insert slidably coupled into the box body. The base insert may include a back wall, and the back wall may have an electrical device aperture therethrough, a box mounting screw aperture therethrough, a center mounting screw aperture therethrough, and a rear face. The rear face may include a center mounting plane at the center mounting screw aperture substantially parallel to the back wall and at least one spacer extending above the center mounting plane from the rear face at the box mounting screw aperture. Other particular implementations of an electrical box assembly may include at least two removable flanges coupled along a front side of the box body.

25 Claims, 4 Drawing Sheets

U.S. PATENT DOCUMENTS

| | | |
|---|---|---|
| 4,342,493 A | 8/1982 | Grenell |
| 4,424,407 A | 1/1984 | Barbic |
| 4,500,746 A | 2/1985 | Meehan |
| 4,737,599 A | 4/1988 | Fontaine |
| 4,757,908 A | 7/1988 | Medlin, Sr. |
| 4,833,277 A | 5/1989 | Jacoby, Jr. et al. |
| 4,844,275 A | 7/1989 | Schnell et al. |
| 4,998,635 A | 3/1991 | Vink et al. |
| 5,072,848 A | 12/1991 | Pipis et al. |
| 5,076,641 A | 12/1991 | Lindberg |
| 5,161,983 A | 11/1992 | Ohno et al. |
| 5,178,350 A | 1/1993 | Vink et al. |
| 5,280,135 A | 1/1994 | Berlin et al. |
| 5,317,108 A | 5/1994 | Prairie, Jr. |
| D350,530 S | 9/1994 | Comerci et al. |
| 5,362,924 A | 11/1994 | Correnti |
| 5,456,373 A | 10/1995 | Ford |
| 5,486,650 A | 1/1996 | Yetter |
| 5,556,289 A | 9/1996 | Holbrook, Jr. |
| 5,594,205 A | 1/1997 | Cancellieri et al. |
| 5,651,696 A | 7/1997 | Jennison |
| 5,731,544 A | 3/1998 | Burck et al. |
| 5,763,831 A | 6/1998 | Shotey et al. |
| 5,779,083 A | 7/1998 | Bordwell |
| 6,066,805 A | 5/2000 | Bordwell et al. |
| 6,133,531 A | 10/2000 | Hayduke et al. |
| 6,180,879 B1 | 1/2001 | Gretz |
| 6,222,123 B1 | 4/2001 | Schwarz |
| 6,420,653 B1 | 7/2002 | Shotey et al. |
| 6,420,654 B1 | 7/2002 | Shotey et al. |
| 6,437,242 B1 | 8/2002 | Radosavljevic et al. |
| 6,441,307 B1 | 8/2002 | Shotey et al. |
| 6,476,321 B1 | 11/2002 | Shotey et al. |
| 6,818,823 B2 * | 11/2004 | Barnes ................. 174/50 |

* cited by examiner

RECESSED ELECTRICAL OUTLET COVER AND BOX

CROSS REFERENCE TO RELATED APPLICATIONS

This document claims the benefit of the filing date of U.S. Provisional Patent Application 60/756,023, entitled "Recessed Electrical Outlet Cover and Box" to Kinnard, et al. which was filed on Jan. 3, 2006, the contents of which are hereby incorporated by reference.

BACKGROUND

1. Technical Field

Aspects of this document relate generally to covers and boxes for electrical devices.

2. Background Art

Electrical devices are often installed in buildings by pulling wire into an opening in an electrical box into which an electrical device has been coupled. Conventionally, many electrical boxes are installed while a wall is being constructed, often through attachment to a wall stud. Later, as drywall or siding materials are used to cover the wall studs, the electrical box often becomes recessed with respect to the surface of the finished wall. When electrical boxes are installed in an exterior wall of a building, the depth the electrical box is recessed often varies considerably depending upon the type of wall finish used (siding, stucco, brick, etc.). Also, when an electrical box is installed in an exterior wall, the electrical device within the box may require protection from water and other contaminants while an electrical connector is coupled with the electrical device.

SUMMARY

Aspects of this invention relate to an electrical box assembly with a box body having removable flanges and a base insert with spacers to aid in securing electrical devices installed within the assembly. Implementations of an electrical box assembly may include one, any combination, or all of the following aspects:

In one aspect, an electrical box assembly may include a box body having a screw mount aperture and a base insert slidably coupled into the box body. The base insert may include a back wall, and the back wall may have an electrical device aperture therethrough, a box mounting screw aperture therethrough, a center mounting screw aperture therethrough, and a rear face. The rear face may include a center mounting plane defined by the back wall of the center mounting screw aperture and at least one spacer at the box mounting screw aperture extending above the center mounting plane from the rear face.

In a second aspect, an electrical box assembly may include a box body having a front edge and at least one removable flange and in particular implementations at least two removable flanges each having a length. The flanges may each be grooved for at least a majority of its length along a side of the flange. The flanges and the box body may be coupled together at the front edge of the box body and the groove of each flange may be substantially parallel to the front edge of the box body.

Implementations may include one, any combination, or all of the following:

The base insert may include a spacer that may extend around the box mounting screw apertures. In other implementations, the spacer may be adjacent to the box mounting screw aperture.

The box body may have an interior surface with a mounting feature configured to couple with a clip of an extension frame. The mounting feature may further include at least one reentrant slot configured to engage with the clip of the extension frame. In particular implementations, the electrical box assembly may further include a surface cover configured to couple with the extension frame. In other implementations, the surface cover may be configured to couple with the box body. The extension frame also may be coupled to the box body between a base insert and the box body. In other particular implementations, the surface cover piece may be coupled to the box body between a base insert and the box body.

A base insert may be slidably coupled with the box body and may include an electrical device aperture large enough to receive at least one electrical device face. The base insert may also include a lid coupled with the base insert through a hinge. In particular implementations, the base insert may also have a front edge with a width. The width may have at least one groove therein and the lid may include at least one shield projection extending outward from a rear surface of the lid. The at least one shield projection may couple into the at least one groove of the front edge of the base insert when the lid is closed over the base insert through the hinge.

The base insert may also include, in particular implementations, at least one removable tab, where removal of the at least one removable tab converts the electrical device aperture from an electrical device aperture opening configured for a first electrical device configuration to an electrical device aperture opening configured for a second electrical device configuration different from the first electrical device configuration. The base insert may further include an adapter plate, the adapter plate having an electrical device aperture large enough to receive at least one electrical device face and at least one removable tab, where removal of the at least one removable tab converts the electrical device aperture from an electrical device aperture opening configured for a first electrical device configuration to an electrical device aperture opening configured for a second electrical device configuration different from the first electrical device configuration.

The at least two flanges each grooved for at least a majority of its length along a side of the flange and coupled to the front edge of the box body may also include a thickness and the groove of each flange may be on a first side of the flange. The groove may include a depth equal to between 40% and 50% of the thickness of the flange. In other particular implementations, the at least two flanges may include a thickness and the groove of each flange may be on a second side of the flange. The groove may include a depth equal to between 20% and 40% of the thickness of the flange. In yet other implementations, the at least two flanges may include a thickness and each have at least one of a groove on a first side and a groove on a second side having a depth equal to between 20% and 50% of the thickness of the flange.

The box body may also include at least two angled nail attachment features coupled to the box body.

In a third aspect, an electrical box assembly may include a method of installation which includes the steps of sliding a base insert into the box body of an electrical box assembly over an electrical device coupled with the box body. The base insert may include a rear face, and the rear face may have a center mounting plane at the center mounting screw aperture substantially parallel to the back wall of the box body and at least one spacer extending above the center mounting plane from the rear face at the box mounting screw aperture. The method of installation may also include the step of coupling the at least one spacer with the electrical device by coupling the base insert to the box body with a box mounting screw. The method may also include the step of flexing the rear face of the base insert by coupling the electrical device to the base insert by inserting a center mounting screw through the center mounting screw aperture of the rear face.

Particular implementations of an electrical box assembly may include an installation method that further includes the step of coupling an extension frame with the box body. The method may also include the step of coupling a surface cover with the box body in particular implementations.

These general and specific aspects may be implemented using an electrical box assembly, a method, or any combination of electrical box assemblies and methods.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical box assembly and/or assembly procedures for an electrical box assembly will become apparent for use with implementations of an electrical box assembly from this disclosure. Accordingly, for example, although particular box bodies, adapter plates, extension frames, or spacers are disclosed, such box bodies, adapter plates, extension frames, or spacers and implementing components may comprise any shape, size, style, type, model, version, measurement, concentration, material, quantity, and/or the like as is known in the art for such box bodies, adapter plates, extension frames, or spacers and implementing components, consistent with the intended operation of an electrical box assembly.

Structure.

Figure 1:
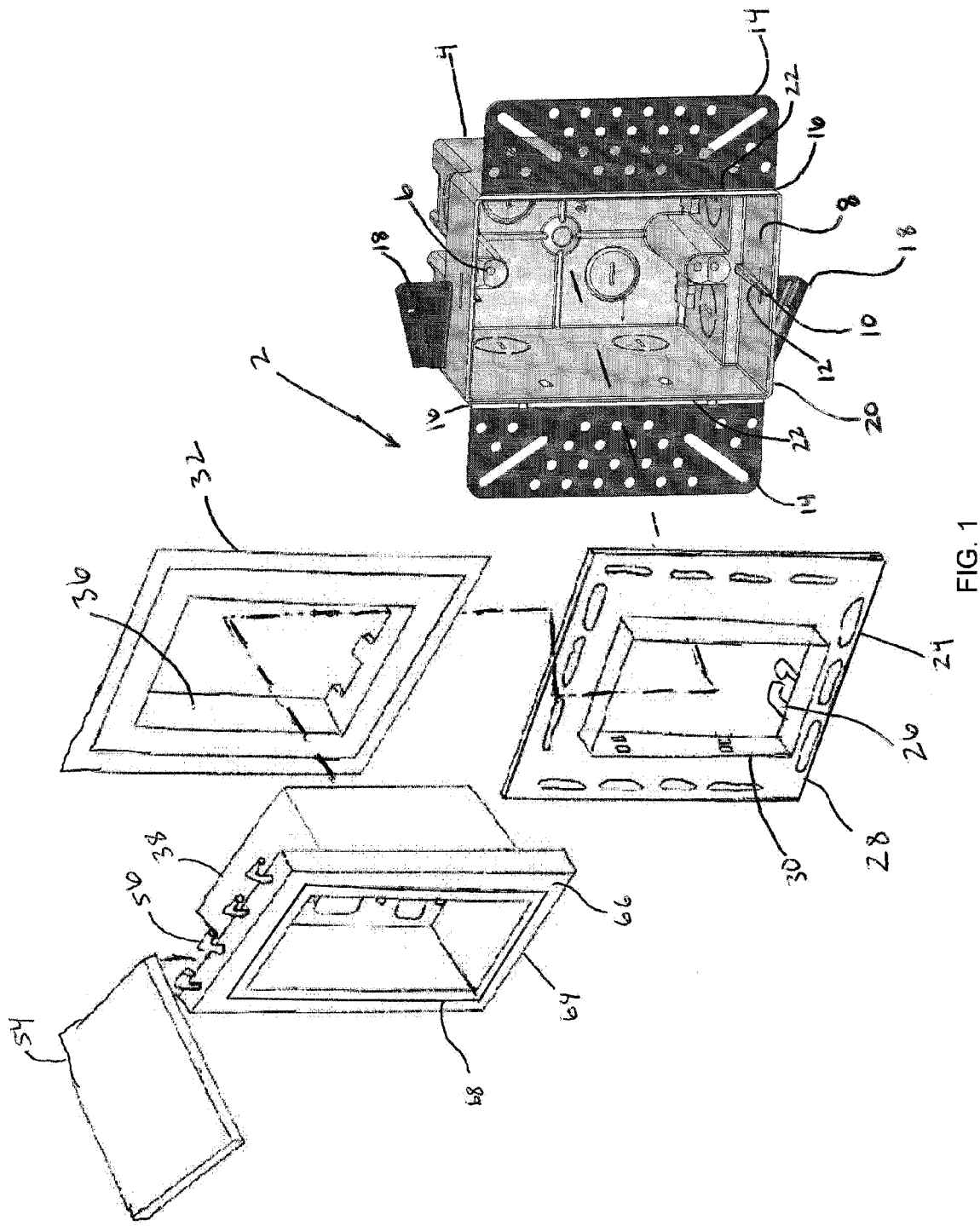
FIG. 1 is a break apart view of a particular implementation of an electrical box assembly.

Referring to FIG. 1, a particular implementation of an electrical box assembly 2 is illustrated. As illustrated, the electrical box assembly 2 may include a box body 4. The box body 4 may include a screw mount aperture 6 for use in coupling an electrical device with the box body 4. Particular implementations of a box body 4 may include an interior surface 8 which includes a mounting feature 10 having a reentrant slot 12 or alternatively a slot through the box body wall. The mounting feature 10 which includes the reentrant slot 12 may be dimensioned to couple with a clip 26 of an extension frame 24. To aid in installing the electrical box assembly 2 against a wall stud, at least two nail attachment features 18 may be coupled with the box body 4.

Particular implementations of a box body 4 may be coupled directly to a wall surface and may therefore include a front edge 20 and at least two flanges 14 that are coupled at the front edge 20. The flanges 14 may each be grooved with a groove 16 along a side 22 for at least a majority of the length of the side 22 to permit them to be removed if the box body 4 is to be mounted to a stud. In particular implementations of a box body 4, the flanges 14 grooved for at least a majority of the length of their sides 22 may include grooves 16 that continuously extend down the sides 22 of the flanges 14 or grooves 16 that may have ungrooved or perforated areas in locations along the sides 22 of the flanges 14. The grooves 16 may be located on either a first or a second side of the flanges 14 or on both the first and second sides and inwardly extend into the thickness of the flanges 14.

Removal of the flanges 14 an important feature of the grooves 16, and research has been done to determine which ranges of thicknesses of grooves work best. When the grooves 16 are located on a first side of the flanges 14, the depth of the grooves 16 may be equal to between 40% and 50% of the flanges' 14 thickness. When the grooves 16 are located on a second side of the flanges 14 the depth of the grooves 16 may be equal to between 20% and 40% of the thickness of the flanges 14. When the grooves 16 are located on both the first and second side of the flanges 14, the depth of the grooves 16 may be equal to between 20% and 50% of the flanges' 14 thickness. The grooves 16 may also include groove peaks. In particular implementations of flanges 14 that include grooves on both the first and second sides of the flanges 14, the groove peaks on each of the sides of the flanges 14 may be unaligned with each other to ensure the flanges 14 are more cleanly separated from the front edge 22 of the box body 4. Relevant disclosure regarding the structure and use of the grooves 16 may be found in U.S. Pat. No. 6,960,721 to Shotey et al. entitled "Convertible Electrical Device Cover Having Removable Tabs With Offset Grooves," the disclosure of which is hereby incorporated by reference (see in particular FIG. 5 of the referenced patent).

Figure 2:
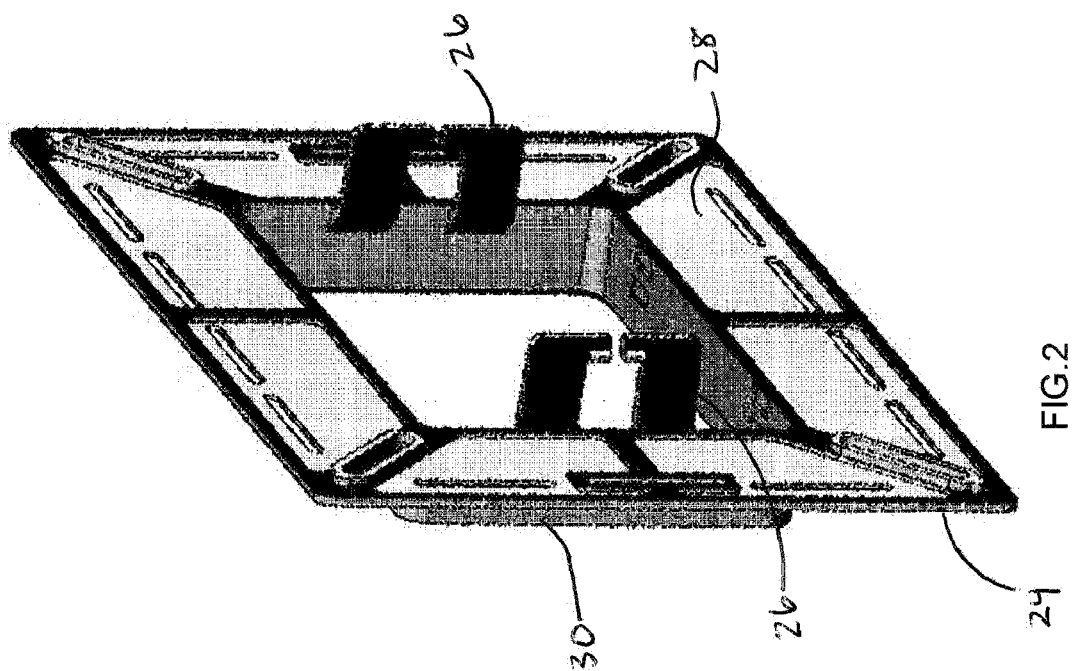
FIG. 2 is a rear perspective view of a particular implementation of an extension frame.

Referring to FIG. 2, particular implementations of an electrical box assembly 2 may include an extension frame 24. The extension frame 24 may have clips 26 dimensioned to engage with the mounting features 10 on the box body 4 to hold the extension frame 24 in place. The extension frame 24 may also include a flange 28 that extends substantially perpendicular to and beyond the front edge 22 of the box body 4. A sleeve 30 aligned with and that extends the front edge 22 of the box body 4 outward may project from the extension frame 24.

Figure 3:
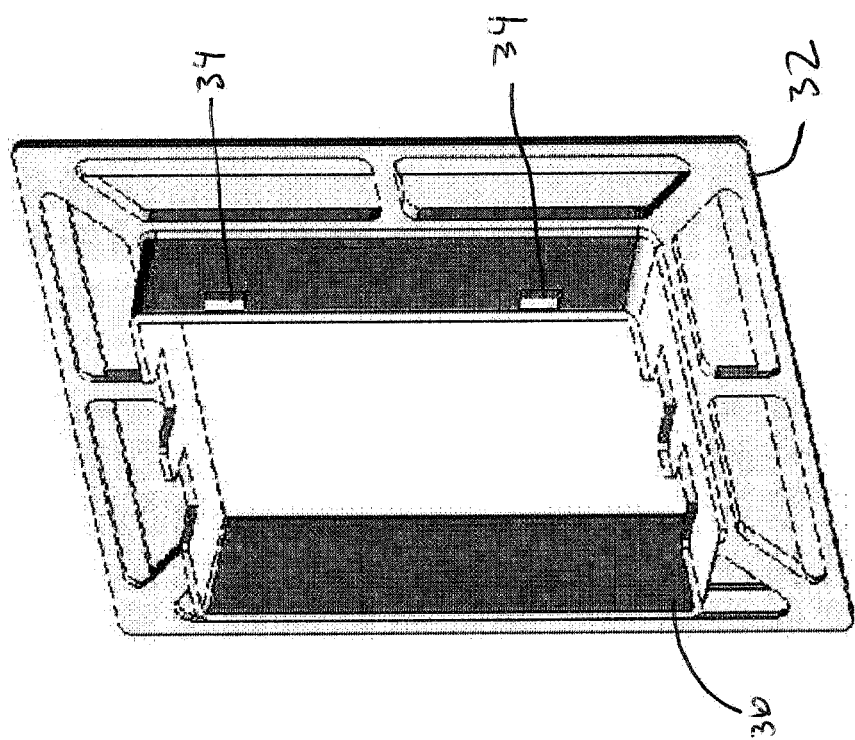
FIG. 3 is a rear perspective view of an implementation of a surface cover.

Referring to FIG. 3, an electrical box assembly 2 may include a surface cover 32 in particular implementations. The surface cover 32 may include mounting features 34 that allow it to be either coupled with the box body 4, the extension frame 24, or with both the box body 4 and extension frame 24. The surface cover 32 may also include a cover sleeve 36 that slidably couples into the sleeve 30 in the extension frame 24 or the interior surface 8 of the box body 4.

Figure 4:
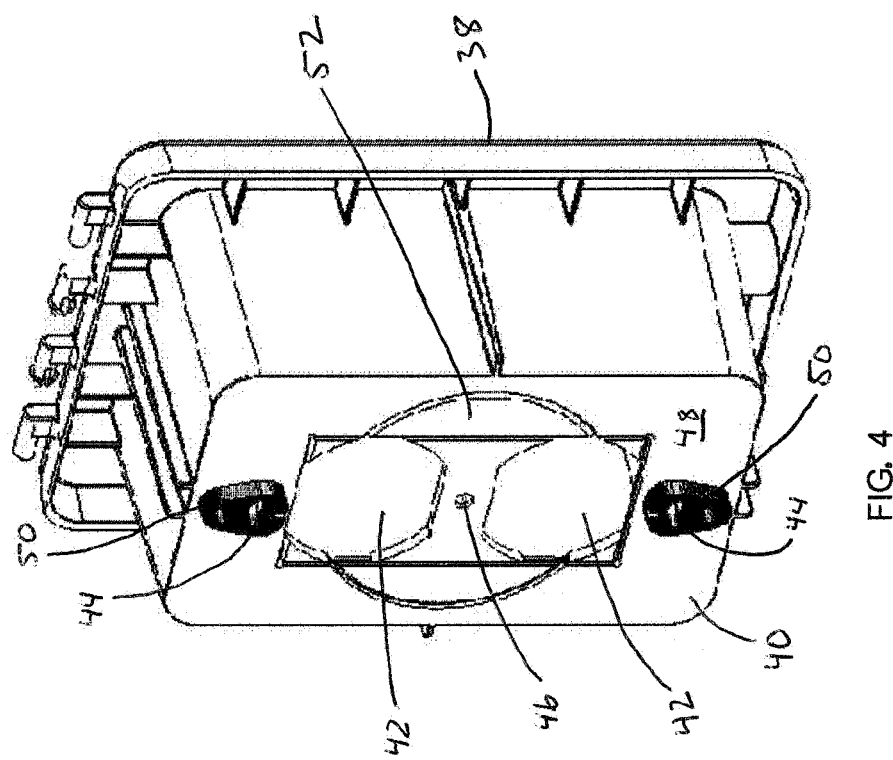
FIG. 4 is a rear perspective view of a particular implementation of a base insert with spacers.

In particular implementations of an electrical box assembly 2, a base insert 38, like that illustrated in FIG. 4, may also be slidably coupled into the box body 4. The base insert 38 may include a back wall 40 which may have an electrical device aperture 42, box mounting screw apertures 44, and a center mounting screw aperture 46 therethrough. The electrical device aperture 42 may be large enough to receive at least one electrical device face. The back wall 40 may also include a rear face 48. The rear face 48 may also include a center mounting plane substantially parallel to the back wall 40 and substantially co-planar with the rear face 48 at the level of the center mounting screw aperture 46. This center mounting plane may be located inwardly or outwardly relative to the overall back wall 40 in particular implementations of a base insert 38. Regardless of the location of the center mounting plane relative to the back wall 40, a spacer 50 may extend above the center mounting plane from the rear face 48 at the box mounting screw aperture 44. The spacer 50 may be coupled with the rear face 48 as a separate piece, or may be formed integrally with the back wall 40 of the base insert 38. In particular implementations, the spacer 50 may extend around the box mounting screw aperture 44, may be adjacent to it, or only partially extend around the box mounting screw aperture 44.

The back wall 40 of the base insert 38 may also include at least one removable tab 52. Removal of the at least one removable tab 52 allows the electrical device aperture 42 to be converted from a first electrical device configuration to a second electrical device configuration. In the implementation illustrated in FIG. 4, the electrical device aperture 42 is large enough to accommodate the face of a duplex receptacle. Removal of the removable tab 52 would convert the electrical device aperture 42 to receive the face of a round outlet. Other particular implementations of a base insert 38 may include an adapter plate that has at least one removable tab large enough to receive the face of an electrical device. The adapter plate and/or removal of the removable tab in the adapter plate may allow the electrical device aperture 42 in the base insert 38 to be converted from a first to a second electrical device configuration. Relevant disclosure regarding the structure and use of removable tabs and adapter plates and the attachment of adapter plates to the base are found in U.S. Pat. No. 6,960,721 to Shotey et al. entitled "Convertible Electrical Device Cover Having Removable Tabs With Offset Grooves," the disclosure of which was previously incorporated by reference.

Figure 5:
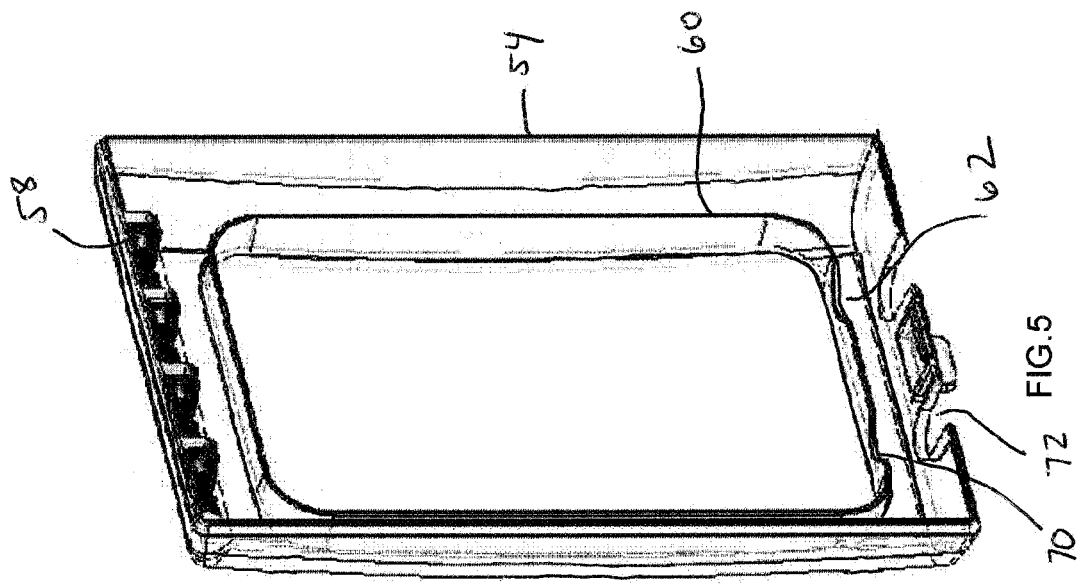
FIG. 5 is a rear perspective view of an implementation of a lid with a shield projection extending from a rear surface of the lid.

Referring to FIGS. 1 and 5, particular implementations of an electrical box assembly 2 may include a lid 54 coupled to the base insert 38 through a hinge. The hinge may be composed of base hinge members 56 coupled to the base insert 38 and lid hinge members 58 coupled to the lid 54. The lid 54 may also include a shield projection 60 that extends outwardly from a rear face 62 of the lid 54. The shield projection 60 may be sized to couple into a groove 68 in a width 66 of a front face 64 of the base insert 38. The shield projection 60 may extend entirely around the lid 54 and may be partially or completely interrupted by cord port openings 70 aligned to accommodate passage of an electrical cord through a cord port 72. The cord port 72 in particular implementations may be in a surface of the lid 54 or the base insert 38, or may be in a surface of both the lid 54 and the base insert 38. In addition, in other implementations, the aperture in the cord port 72 may be open, closed by a barrier intended to limit the ingress of water or other contaminants into the cover through the cord port 72, or closed by a removable tab in the base insert 38, the lid 54, or in both the base insert 54 and the lid 54. Removal of the removable tab by the user may open the aperture in the cord port 72 and allows the user to close the lid 54 when an electrical device connector is inserted into the electrical box assembly 2. Particular implementations may also include a plurality of cord ports 72.

Materials.

The components defining any implementation of an electrical box assembly 2 may be formed of any of many different types of materials or combinations thereof that can readily be formed into shaped objects, provided that the components selected are consistent with the intended operation of an electrical box assembly 2 implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, led, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Referring to FIGS. 1 and 4, for the exemplary purposes of this disclosure, the box body 4, extension frame 24, surface cover 32, base insert 38, and lid 54 illustrated in FIG. 1 may be formed of a plastic material. The spacers 50 may be formed of a plastic, rubber, or metal material.

Moreover, some of the components defining any electrical box implementation may be manufactured simultaneously and integrally joined with one another, while the other components may be purchased pre-manufactured or manufactured separately and then assembled with the integral components. The various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components.

Use.

Figure 7:
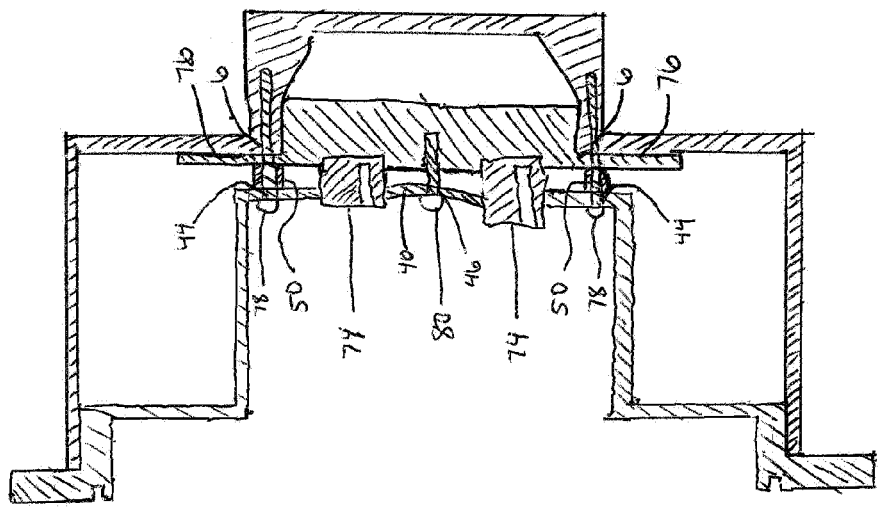
FIG. 7 is a cross sectional view along the sectional line A of the implementation of a base insert and box body shown in FIG. 6.
Figure 6:
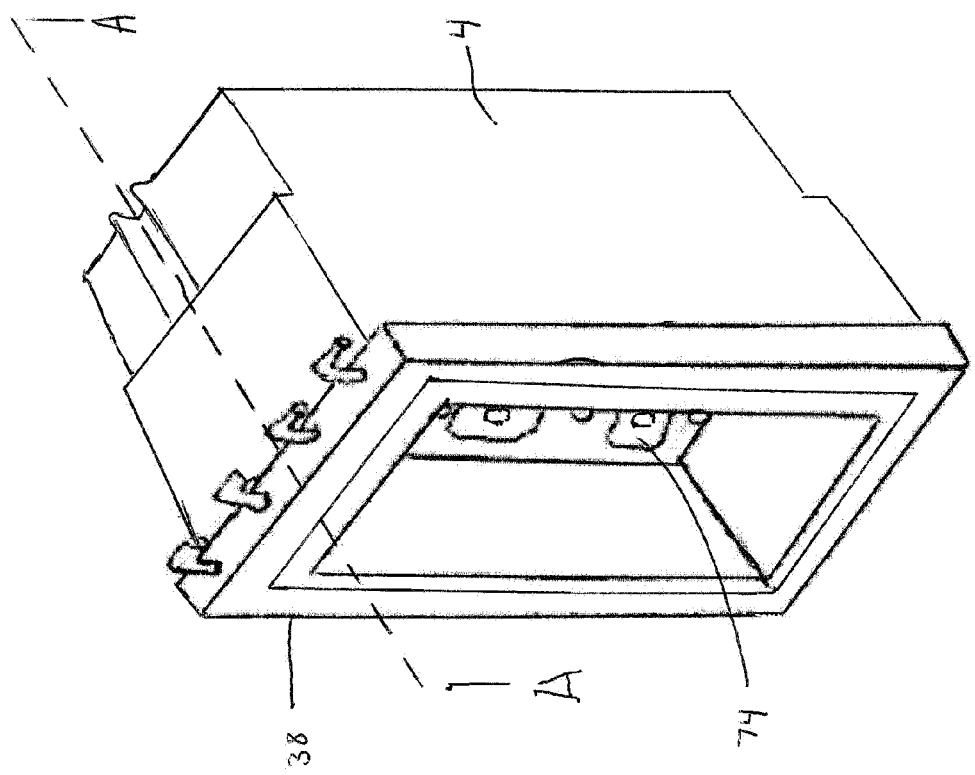
FIG. 6 is a front perspective view of a particular implementation of a base insert slidably coupled into a box body showing the sectional line A.

Referring to FIGS. 6 and 7, a particular implementation of a base insert 38 is shown slidably coupled into a box body 4. To form the assembly illustrated in FIG. 6, in particular implementations, an electrical device 74 (here a duplex receptacle) may be inserted into the box body 4 with the yokes 76 of the electrical device 74 resting against the screw mount apertures 6 in the box body 4 and the box mounting screws 78 loosely holding the electrical device 74 in place. The base insert 38 may then be slidably coupled into the box body 4 until the spacers 50 rest against the yokes 76 of the electrical device 74 and the box mounting screws 78 extend through the keyhole slot apertures used for the box mounting screw apertures 44 of the base insert 38. Box mounting screws 78 may then be tightened into the screw mount apertures 6 of the box body 4.

After the box mounting screw 78 are tightened down, a center mounting screw 80 may then inserted into the center mounting screw aperture 46 of the base insert 38. The back wall 40 of the base insert 38 may then be flexed by tightening the center mounting screw 80 and pulling the spacers 50 against the yokes 76 of the electrical device 74. Since the flexing of the back wall 40 pulls the spacers 50 against the yokes 76 of the electrical device 74, the amount the electrical device 74 can bend under the insertion force of an electrical connector may be reduced. This may help reduce the likelihood of damage to the base insert 38 and increase the solid feel of the electrical device 74 when installed in the electrical box assembly 2.

Referring to FIG. 1, an electrical box assembly 2 may be assembled by first placing a box body 4 into a wall during construction. The box body 4 may be installed within the wall directly to a stud through the nail attachment features 18 or may be installed directly to the wall material (siding, drywall, etc.) through the flanges 14. When the box body 4 is installed directly to a stud with the nail attachment features 18, the flanges 14 will normally be removed through the grooves 16. In some implementations, an extension frame 24 may be coupled with the box body 24 through the clips 26. The extension frame 24 is likely to be used when the box body 4 is installed in an exterior wall where brick, stucco, or siding makes the wall thickness greater than an interior wall. The sleeve 30 of the extension frame 24 may allow the exterior wall material (brick, stucco, or siding) to be placed over the flange 28 against the sleeve 30 after the box body 4 has been installed inside the wall. In some implementations, after the extension frame 24 has been coupled with the box body 4, a surface cover 32 may be coupled to the sleeve 30 of the extension frame to provide aesthetic appeal and aid in sealing the electrical box assembly 2 against contaminants. In other implementations, the surface cover 32 may installed directly within the box body 4 and no extension frame 24 may be required as when the electrical device assembly 2 is installed within an interior wall where wall thickness is minimal.

Depending upon whether the surface cover 32 or extension frame 24 are being used, a base insert 38 may be slidably coupled into the box body 4 through the cover sleeve 36 and the sleeve 30 of the extension frame 24 or through either the cover sleeve 36 or the sleeve 30 of the extension frame 24. In other particular implementations, the base insert 38 may slidably couple directly into the box body 4 when neither the surface cover 32 nor the extension frame 24 have been installed. Finally, a lid 54 may be coupled to the base insert 38 through a hinge composed of base hinge members 56 and lid hinge members 58. As the lid 54 is rotated down over the base insert, the shield projection 60 on the rear surface 62 of the lid 54 may couple into the groove 68 in the width 66 of the front edge 64 of the base insert 38. When the shield projection 60 is coupled into the groove 68, the shield projection 60 may help ensure that water or other contaminants cannot easily find access into the interior of the electrical box assembly 2, even while the electrical box assembly 2 is in use with an electrical cord extending through a cord port in a surface of the assembly.

It will be understood that implementations are not limited to the specific components disclosed herein, as virtually any components consistent with the intended operation of a method and/or system implementation for an electrical box assembly may be utilized. Accordingly, for example, although particular box bodies, adapter plates, or spacers may be disclosed, such components may comprise any shape, size, style, type, model, version, class, grade, measurement, concentration, material, weight, quantity, and/or the like consistent with the intended operation of a method and/or system implementation for an electrical box assembly may be used.

In places where the description above refers to particular implementations of an electrical box assembly, it should be readily apparent that a number of modifications may be made without departing from the spirit thereof and that these implementations may be applied to other electrical box assemblies. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical box assembly comprising:
a box body comprising a screw mount aperture; and
a base insert slidably coupled into the box body, the base insert comprising a back wall, the back wall comprising an electrical device aperture therethrough large enough to receive at least one electrical device face, a box mounting screw aperture therethrough, a center mounting screw aperture therethrough, and a rear face, the rear face comprising a center mounting plane substantially co-planar with the rear face at the level of the center mounting screw aperture and at least one spacer extending beyond the center mounting plane from the rear face at the box mounting screw aperture.

2. The electrical box assembly of claim 1, wherein the spacer extends around the box mounting screw aperture.

3. The electrical box assembly of claim 1, wherein the spacer is adjacent to the box mounting screw aperture.

4. The electrical box assembly of claim 1, wherein the electrical box assembly further comprises an extension frame comprising at least one clip and wherein the box body further comprises an interior surface, the interior surface comprising a mounting feature configured to couple with the clip of the extension frame.

5. The electrical box assembly of claim 4, wherein the mounting feature further comprises at least one slot configured to engage with the clip of the extension frame.

6. The electrical box assembly of claim 4, wherein the electrical box assembly further comprises a surface cover configured to couple with the extension frame.

7. The electrical box assembly of claim 1, wherein the electrical box assembly further comprises a surface cover configured to couple with the box body.

8. The electrical box assembly of claim 1, wherein the base insert further comprises a lid coupled with the base insert through a hinge.

9. The electrical box assembly of claim 8, wherein the base insert further comprises a front edge, the front edge comprising a width, the width further comprising at least one groove therein, and the lid comprising at least one shield projection extending outward from a rear surface of the lid wherein the at least one shield projection couples into the at least one groove of the front edge of the base insert when the lid is closed over the base insert through the hinge.

10. The electrical box assembly of claim 1, wherein the base insert further comprises at least one removable tab, wherein removal of the at least one removable tab converts the electrical device aperture from an electrical device aperture opening configured for a first electrical device configuration to an electrical device aperture opening configuration for a second electrical device configuration different from the first electrical device configuration.

11. The electrical box assembly of claim 1, wherein the base insert further comprises an adapter plate, the adapter plate comprising an electrical device aperture large enough to receive at least one electrical device face and at least one removable tab, wherein removal of the at least one removable tab converts the electrical device aperture from an electrical device aperture opening configured for a first electrical device configuration to an electrical device aperture opening configured for a second electrical device configuration different from the first electrical device configuration.

12. The electrical box assembly of claim 1, wherein the box body comprises at least two flanges each grooved for at least a majority of its length along a side of the flange and wherein the flanges and the box body are coupled together at a front edge of the box body and the groove of each flange is substantially parallel to the front edge of the box body.

13. A method of installing an electrical box assembly, the method comprising:
sliding a base insert into the box body of an electrical box assembly over an electrical device coupled with the box body, the base insert comprising a rear face, the rear face comprising a center mounting plane substantially co-planar with the rear face at the level of the center mounting screw aperture and at least one spacer extending above the center mounting plane from the rear face at the box mounting screw aperture;
coupling the at least one spacer with the electrical device by coupling the base insert to the box body with a box mounting screw;
inserting a center mounting screw through the center mounting screw aperture of the rear face; and
flexing the rear face of the base insert by tightening the center mounting screw.

14. The method of installing an electrical box assembly of claim 13, wherein the method further comprises coupling an extension frame with the box body.

15. An electrical box assembly comprising:
a box body comprising a front edge;
a base insert slidably coupled with the box body, the base insert comprising an electrical device aperture large enough to receive at least one electrical device face, the base insert further comprising a box mounting screw aperture therethrough, a center mounting screw aperture therethrough, and a rear face, the rear face comprising a center mounting plane substantially co-planar with the rear face at the level of the center mounting screw aperture and at least one spacer extending beyond the center mounting plane from the rear face at the box mounting screw aperture; and
at least two removable flanges each comprising a length, the flanges each grooved for at least a majority of its length along a side of the flange;
wherein the flanges and the box body are coupled together at the front edge of the box body and the groove of each flange is substantially parallel to the front edge of the box body.

16. The electrical box assembly of claim 15, wherein an extension frame is coupled to the box body between the base insert and the box body.

17. The electrical box assembly of claim 15, wherein a surface cover piece is coupled to the box body between the base insert and the box body.

18. The electrical box assembly of claim 15, wherein the base insert further comprises a lid coupled with the base insert through a hinge.

19. The electrical box assembly of claim 18, wherein the base insert further comprises a front edge, the front edge comprising a width, the width further comprising at least one groove therein, and the lid comprising at least one shield projection extending outward from a rear surface of the lid wherein the at least one shield projection couples into the at least one groove of the front edge of the base insert when the lid is closed over the base insert through the hinge.

20. The electrical box assembly of claim 15, wherein the base insert further comprises at least one removable tab, wherein removal of the at least one removable tab converts the electrical device aperture from an electrical device aperture opening configured for a first electrical device configuration to an electrical device aperture opening configured for a second electrical device configuration different from the first electrical device configuration.

21. The electrical box assembly of claim 15, wherein the base insert further comprises an adapter plate, the adapter plate comprising an electrical device aperture large enough to receive at least one electrical device face and at least one removable tab, wherein removal of the at least one removable tab converts the electrical device aperture from an electrical device aperture opening configured for a first electrical device configuration to an electrical device aperture opening configured for a second electrical device configuration different from the first electrical device configuration.

22. The electrical box assembly of claim 15, wherein the at least two flanges comprise a thickness and the groove of each flange is on a first side of the flange and the groove comprises a depth equal to between 40% and 50% of the thickness of the flange.

23. The electrical box assembly of claim 15, wherein the at least two flanges comprise a thickness and the groove of each flange is on a second side of the flange and the groove comprises a depth equal to between 20% and 40% of the thickness of the flange.

24. The electrical box assembly of claim 15, wherein the box body further comprises at least two angled nail attachment features coupled to the box body.

25. An electrical box assembly comprising:
a box body comprising a front edge;
a base insert slidably coupled with the box body, the base insert comprising a box mounting screw aperture therethrough, a center mounting screw aperture therethrough, and a rear face, the rear face comprising a center mounting plane substantially co-planar with the rear face at the level of the center mounting screw aperture and at least one spacer extending beyond the center mounting plane from the rear face at the box mounting screw aperture; and
at least two removable flanges each comprising a length, the flanges each grooved for at least a majority of its length along a side of the flange;
wherein the flanges and the box body are coupled together at the front edge of the box body and the groove of each flange is substantially parallel to the front edge of the box body; and
wherein the at least two flanges comprise a thickness and each comprise at least one of a groove on a first side and a groove on a second side comprising a depth equal to between 20% and 50% of the thickness of the flange.

* * * * *